US012645893B2

(12) United States Patent
Yamaguchi et al.

(10) Patent No.: US 12,645,893 B2
(45) Date of Patent: Jun. 2, 2026

(54) CLOUD-ASSISTED IN-VEHICLE LARGE LANGUAGE MODEL USE

(71) Applicant: TOYOTA JIDOSHA KABUSHIKI KAISHA, Aichi-ken (JP)

(72) Inventors: Koichiro Yamaguchi, Meguro-ku (JP); Yusuke Yachide, Tokyo (JP); Masateru Udate, Edogawa-ku (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 183 days.

(21) Appl. No.: 18/748,020

(22) Filed: Jun. 19, 2024

(65) Prior Publication Data

US 2025/0390686 A1 Dec. 25, 2025

(51) Int. Cl.

*G10L 15/00* (2013.01)
*B60Q 9/00* (2006.01)
*G06F 40/40* (2020.01)

(52) U.S. Cl.

CPC ............... *G06F 40/40* (2020.01); *B60Q 9/00* (2013.01)

(58) Field of Classification Search

None
See application file for complete search history.

(56) References Cited

U.S. PATENT DOCUMENTS 10,169,315 B1 * 1/2019 Heckel .................. G06F 40/166
11,024,299 B1 * 6/2021 Drake ................... G10L 15/197
2019/0135303 A1 5/2019 Kim et al.
2019/0332658 A1 * 10/2019 Heckel ................... G06N 3/048
2021/0027767 A1 * 1/2021 Sriram ................. G06N 3/0895
2021/0064393 A1 3/2021 Pipe et al.
2021/0073461 A1 * 3/2021 Heckel ...................... G06N 3/08
2022/0171946 A1 * 6/2022 Xu ........................ G06N 3/0464

FOREIGN PATENT DOCUMENTS

CN 110807331 A * 2/2020 ............. G06N 3/084
CN 111611377 A * 9/2020 ............. G06N 3/045
CN 116415170 A * 7/2023 ............. G06F 18/24

OTHER PUBLICATIONS

Kan Z, Qiao L, Yu H, Peng L, Gao Y, Li D. Protecting user privacy in remote conversational systems: A privacy-preserving framework based on text sanitization. arXiv preprint arXiv:2306.08223. Jun. 14, 2023. (Year: 2023).*

Liu A, Han X, Wang Y, Tsvetkov Y, Choi Y, Smith NA. Tuning language models by proxy. arXiv preprint arXiv:2401.08565. Jan. 16, 2024. (Year: 2024).*

* cited by examiner

*Primary Examiner* — Shreyans A Patel
(74) *Attorney, Agent, or Firm* — HAUPTMAN HAM, LLP

(57) ABSTRACT

Cloud-assisted in-vehicle large language model use is performed by inputting an unredacted prompt into a first Large Language Model (LLM) installed in a vehicle, wherein the unredacted prompt includes personal information relating to an occupant of the vehicle, transmitting a redacted prompt to a second LLM installed in a cloud, the redacted prompt representing the unredacted prompt without the personal information, receiving a logit of the second LLM, inputting the redacted prompt into a third LLM installed in the cloud or the vehicle, the third LLM including an identical parameter set to the first LLM, determining a difference between a logit of the first LLM and a logit of the third LLM, determining a sum of the difference and the logit of the second LLM to obtain an adjusted logit, and acquiring an output from the adjusted logit.

20 Claims, 10 Drawing Sheets

UNREDACTED
PROMPT

320

REDACTED
PROMPT

323

REDACTED
PROMPT

323

VEHICLE
300

FIRST
LLM
310

CLOUD
NETWORK
309

THIRD
LLM
316

FIRST
LLM
LOGIT

321

THIRD
LLM
LOGIT

326

−

327

LOGIT
DIFFERENCE

SECOND
LLM
314

PERSONAL
INFORMATION
312

SECOND
LLM
LOGIT

324

+

LOGIT
SUM

328

UNREDACTED PROMPT  420  423  REDACTED PROMPT  423  REDACTED PROMPT

VEHICLE 400

FIRST LLM 410

THIRD LLM 416

CLOUD NETWORK 409

FIRST LLM LOGIT  421

THIRD LLM LOGIT  426

LOGIT DIFFERENCE  427

PERSONAL INFORMATION 412

SECOND LLM 414

SECOND LLM LOGIT  427

LOGIT SUM  428

CLOUD-ASSISTED IN-VEHICLE LARGE LANGUAGE MODEL USE

BACKGROUND

In order to enhance the user experience in the vehicle, an LLM (Large Language Model) is used to carry out vehicle control, provision of information suitable to the occupant, etc. An LLM can be executed using local computing resources or executed using cloud-based computing resources.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
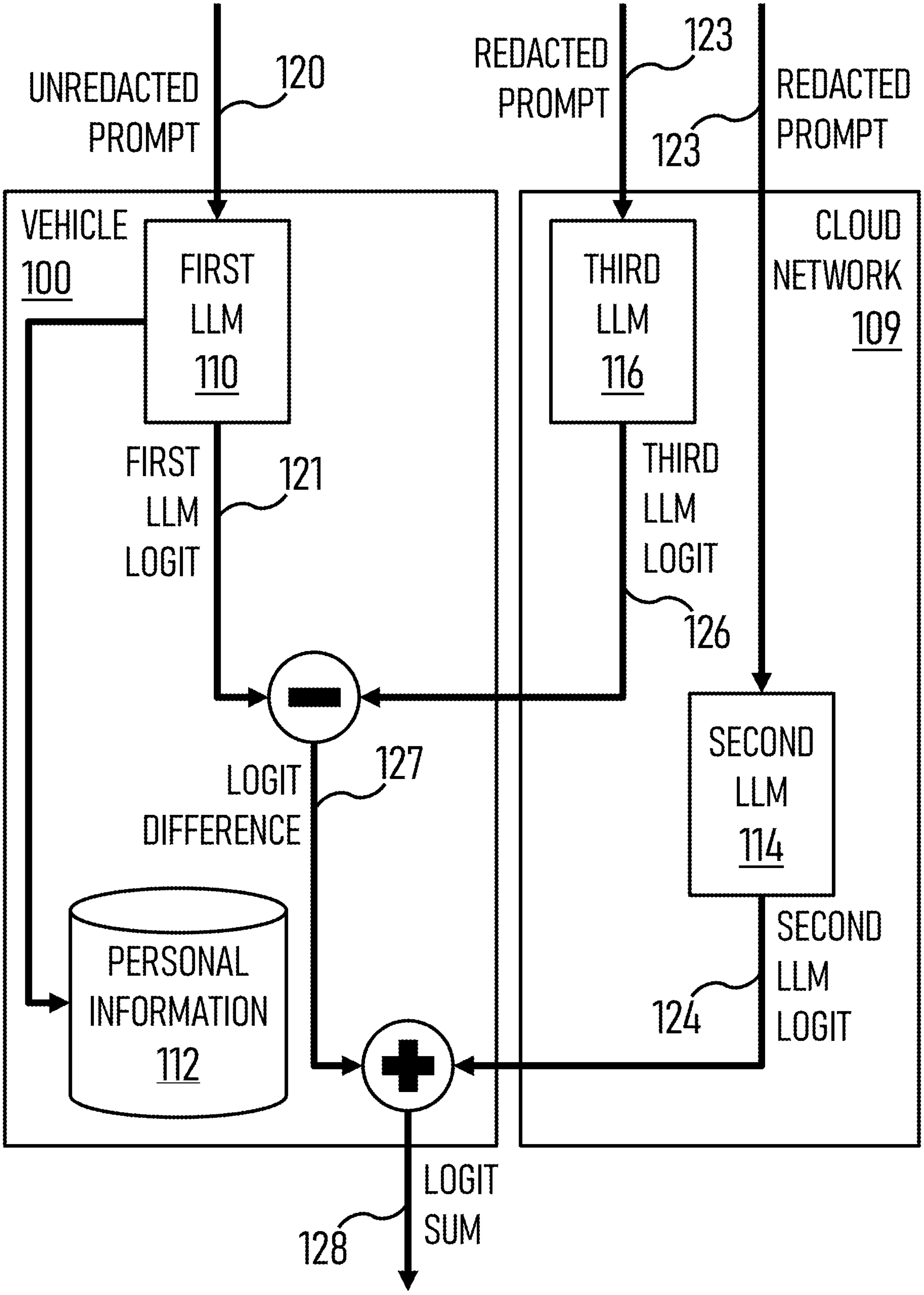
FIG. 1 is a schematic diagram of a system for cloud-assisted in-vehicle large language model use, according to at least some embodiments of the subject disclosure.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. In addition, the present disclosure may repeat reference numerals and/or letters in the various examples. This repetition is for the purpose of simplicity and clarity and does not in itself dictate a relationship between the various embodiments and/or configurations discussed.

An LLM installed in a vehicle may have limited output accuracy because the storage and processing constraints of the vehicle may limit the size of the LLM. Using an LLM installed in the cloud may increase risk of leakage of personal information, which may include personal information of occupants, within input to the LLM. Removing such personal information from input may also limit output accuracy because output from input with the personal information may be more accurate than output from input without the personal information.

In at least some embodiments of the subject disclosure, accurate output is acquired by redacting an unredacted prompt to remove personal information, comparing logits of the unredacted prompt and the redacted prompt using one or two smaller LLMs, and applying the difference to a logit of a larger LLM to obtain an adjusted logit. In at least some embodiments, a logit is an intermediate output from an LLM in the form of an unnormalized vector that includes values that represent likelihoods of the most likely candidates for output. For example, if an input prompt to an LLM is "This road is made of", a logit may include values that represent a 95% likelihood of "asphalt", a 94.6% likelihood of "concrete", a 91.2% likelihood of "dirt", and a 84.3% likelihood of "gravel". In at least some embodiments, a difference between logits represents a mathematical difference between values that represent the likelihoods of each common candidate. For example, if a smaller LLM logit from the unredacted prompt includes a value that represents a 95% likelihood of "asphalt", and a smaller LLM logit from the redacted prompt includes a value that represents a 94.7% likelihood of "asphalt", then the difference in values represents an increase of about 0.3% likelihood of "asphalt", noting that the conversion from unnormalized logit values to percentage of likelihood may not result in such a precise difference in likelihood. In at least some embodiments, this increase in likelihood is assumed to be caused by including personal information in the input. In at least some embodiments, the application of the difference to a logit represents a mathematical sum of the difference value and the logit value representing the likelihood of a candidate. For example, if a larger LLM logit from the redacted prompt includes a value that represents a 94.2% likelihood of "asphalt", then applying a difference value representing an increase of 0.3% results in a value representing about a 94.5% likelihood of "asphalt" in an adjusted logit, noting that the conversion from unnormalized logit values to percentage of likelihood may not result in such a precise sum in likelihood. In at least some embodiments, the most likely candidate according to an adjusted logit may be different from the most likely candidate according to a smaller LLM logit from the unredacted prompt and the most likely candidate according to a larger LLM logit from the redacted prompt.

In at least some embodiments, accuracy of output from the LLM in the vehicle is increased by using a large LLM in the cloud without sending personal information to the cloud. In at least some embodiments, utilizing the other small LLM in the cloud further reduces the computational load on the vehicle.

In at least some embodiments, all of the LLMs have the same logit dimensionality. In at least some embodiments, the one or two smaller LLMs have identical parameter sets, but with different parameter values. In at least some embodiments, one of the two smaller LLMs has been trained on personal information, while the other of the two smaller LLMs and the larger LLM have been generally trained. In at least some embodiments, the difference between logits is determined from a logit from the unredacted prompt and a logit from the redacted prompt output from a single smaller LLM. In at least some embodiments, using a single smaller LLM to determine the difference may reduce resource consumption.

In at least some embodiments, a vehicle has at least one small LLM, and the large LLM is in the cloud. In at least some embodiments, another small LLM can be included in either the vehicle or the cloud. In at least some embodiments, logit comparison between outputs of the at least one small LLM corresponding to the unredacted prompt and the redacted prompt is performed in the vehicle or in the cloud. In at least some embodiments, performing the comparison in the cloud makes more sense in cases where another generally-trained small LLM is in the cloud. In at least some embodiments, logits of the difference and the large LLM are summed in either the vehicle or the cloud. In at least some embodiments, iteration output is accumulated in either the vehicle or the cloud.

In at least some embodiments, a raw prompt may be an instruction, an inquiry, a command, etc. In at least some embodiments, a raw prompt can be framed in an engineered prompt providing context to produce the unredacted prompt. For example, the engineered prompt adds predetermined information, such as information that the user is driving a car. In at least some embodiments, a raw prompt can be supplemented with personal data relevant to the raw prompt, such as precise location, allergy information, recent actions, known preferences, etc., to produce the unredacted prompt. In at least some embodiments, RAG (Retrieval Augmented Generation) techniques are utilized to determine relevant personal information. Examples of personal information, such as occupant information, include facial images of the occupant (ex. driver), voice recordings of the occupant, identification information of a portable terminal of the occupant (for example, MAC address), vehicle operation by the occupant, information on the occupant stored in a storage device in advance, etc. In at least some embodiments, the unredacted prompt can be redacted into the redacted prompt by converting speech to text, converting image data to object data, location generalizing, filtering the raw prompt, randomizing the raw prompt, etc.

FIG. 1 is a schematic diagram of a system for cloud-assisted in-vehicle large language model use, according to at least some embodiments of the subject disclosure. The system includes vehicle 100, cloud network 109, first LLM 110, unredacted prompt 120, personal information 112, first LLM logit 121, second LLM 114, redacted prompt 123, second LLM logit 124, third LLM 116, third LLM logit 126, logit difference 127, and logit sum 128.

Vehicle 100 includes first LLM 110 and personal information 112, and is in communication with cloud network 109. In at least some embodiments, vehicle 100 is configured to support installation and operation of first LLM 110. In at least some embodiments, vehicle 100 is configured to provide transportation for its occupants. In at least some embodiments, vehicle 100 is configured to input unredacted prompt 120 to first LLM 110. In at least some embodiments, vehicle 100 is configured to receive third LLM logit 126 from cloud network 109. In at least some embodiments, vehicle 100 is configured to determine logit difference 127 by comparing first LLM logit 121 and third LLM logit 126. In at least some embodiments, vehicle 100 is configured to receive second LLM logit 124 from cloud network 109. In at least some embodiments, vehicle 100 is configured to determine logit sum 128 by adding logit difference 127 to second LLM logit 124. In at least some embodiments, vehicle 100 includes a network, such as a Controller Area Network (CAN), configured to facilitate transmission of personal information 112 to first LLM 110. In at least some embodiments, vehicle 100 is one of many vehicles equipped with an onboard computing system. In at least some embodiments, vehicle 100 is a car, truck, boat, airplane, submarine, etc. In at least some embodiments, vehicle 100 is configured for transportation, navigation, entertainment, etc.

Cloud Network 109 is in communication with vehicle 100, and includes second LLM 114 and third LLM 116. In at least some embodiments, cloud network 109 is configured to facilitate the transmission of data between vehicle 100 and second LLM 114 and third LLM 116. In at least some embodiments, cloud network 109 is configured to receive the redacted prompt 123 from vehicle 100, and to input redacted prompt 123 to second LLM 114 and third LLM 116. In at least some embodiments, cloud network 109 is configured to transmit second LLM logit 124 and second LLM logit 124 to vehicle 100. In at least some embodiments, cloud network 109 is configured to provide a platform for various cloud-based services. In at least some embodiments, cloud network 109 is configured to interact with internet service providers and data centers. In at least some embodiments, cloud network 109 includes data centers with servers that host cloud services. In at least some embodiments, cloud network 109 is configured for data storage, web hosting, software as a service (SaaS), and more.

First LLM 110 is included in vehicle 100 and is configured to process prompts to produce logits. In at least some embodiments, first LLM 110 is configured to process unredacted prompt 120 to produce first LLM logit 121. In at least some embodiments, first LLM 110 is configured to interact with personal information 112. In at least some embodiments, first LLM 110 has been trained for various language model tasks, such as natural language processing, voice recognition, image processing, etc. In at least some embodiments, first LLM 110 has been trained at least in part using personal information 112. In at least some embodiments, first LLM 110 is configured to interact with other components of vehicle 100. In at least some embodiments, first LLM 110 includes a software module installed in a computing system of vehicle 100. In at least some embodiments, first LLM 110 includes a neural network, instructions for processing input through the neural network, and instructions for converting logits into human or computer interpretable output.

Unredacted prompt 120 serves as the initial input for first LLM 110 and is the basis for redacted prompt 123. In at least some embodiments, unredacted prompt 120 contains personal information, such as information among personal information 112. In at least some embodiments, unredacted prompt 120 is used as the basis for creating redacted prompt 123. In at least some embodiments, unredacted prompt 120 is a voice command, text input, etc. In at least some embodiments, unredacted prompt 120 includes a query, command, etc. from a user.

Personal information 112 includes a collection of personal information, such as the personal information included in unredacted prompt 120. In at least some embodiments, personal information 112 is utilized in redacting the personal information included in unredacted prompt 120 to create redacted prompt 123. In at least some embodiments, personal information 112 is specific to one or more vehicle occupants. In at least some embodiments, personal information 112 is utilized to supplement a raw prompt. In at least some embodiments, personal information 112 includes a database storing and indexing the collection of personal information. In at least some embodiments, the collection of personal information includes a user's name, preferences, etc.

First LLM logit 121 is the output of first LLM 110 based on unredacted prompt 120, and is utilized in calculating logit difference 127. In at least some embodiments, first LLM logit 121 represents intermediate output of first LLM 110. In at least some embodiments, first LLM logit 121 is a vector of probabilities for each possible next word in a sequence. In at least some embodiments, first LLM logit 121 represents a likelihood of each of the most likely candidates for output.

Second LLM 114 is in cloud network 109 and is configured to process prompts to produce logits. In at least some embodiments, second LLM 114 is configured to process redacted prompt 123 to produce second LLM logit 124. In at least some embodiments, second LLM 114 has a greater parameter set than first LLM 110. In at least some embodiments, second LLM 114 has more layers than first LLM 110. In at least some embodiments, second LLM 114 has more interconnections than first LLM 110. In at least some embodiments, second LLM 114 has been trained for various language model tasks, such as natural language processing, voice recognition, image processing, etc. In at least some embodiments, second LLM 114 has been trained for general use, without using personal information 112. In at least some embodiments, second LLM 114 is configured to interact with vehicles and computers other than vehicle 100. In at least some embodiments, second LLM 114 includes a software module executed with computational resources of cloud 109. In at least some embodiments, second LLM 114 includes a neural network, instructions for processing input through the neural network, and instructions for converting logits into human or computer interpretable output.

Redacted prompt 123 represents unredacted prompt 120 with the personal information removed. In at least some embodiments, redacted prompt 123 is input into second LLM 114 and third LLM 116. In at least some embodiments, redacted prompt 123 has undergone speech to text conversion, image data to object data conversion, location generalizing, filtering, randomizing, etc. from unredacted prompt 120.

Second LLM logit 124 is the output of second LLM 114 based on redacted prompt 123, and is utilized in calculating logit sum 128. In at least some embodiments, second LLM logit 124 represents intermediate output of second LLM 114. In at least some embodiments, second LLM logit 124 is a vector of probabilities for each possible next word in a sequence. In at least some embodiments, second LLM logit 124 represents a likelihood of each of the most likely candidates for output. In at least some embodiments, a dimensionality of second LLM logit 124 is identical to first LLM logit 121.

Third LLM 116 is in cloud network 109 and is configured to process prompts to produce logits. In at least some embodiments, third LLM 116 is configured to process redacted prompt 123 to produce third LLM logit 126. In at least some embodiments, third LLM 116 has an identical parameter set to first LLM 110. In at least some embodiments, third LLM 116 has different parameter values than first LLM 110. In at least some embodiments, third LLM 116 has been trained for various language model tasks, such as natural language processing, voice recognition, image processing, etc. In at least some embodiments, third LLM 116 has been trained for general use, without using personal information 112. In at least some embodiments, third LLM 116 is configured to interact with vehicles and computers other than vehicle 100. In at least some embodiments, third LLM 116 includes a software module executed with computational resources of cloud 109. In at least some embodiments, third LLM 116 includes a neural network, instructions for processing input through the neural network, and instructions for converting logits into human or computer interpretable output.

Third LLM logit 126 is the output of third LLM 116 based on redacted prompt 123, and is utilized in calculating logit difference 127. In at least some embodiments, third LLM logit 126 represents intermediate output of third LLM 116. In at least some embodiments, third LLM logit 126 is a vector of probabilities for each possible next word in a sequence. In at least some embodiments, third LLM logit 126 represents a likelihood of each of the most likely candidates for output. In at least some embodiments, a dimensionality of third LLM logit 126 is identical to first LLM logit 121 and second LLM logit 124.

Logit difference 127 represents the difference between first LLM logit 121 and third LLM logit 126. In at least some embodiments, logit difference 127 is utilized in calculating logit sum 128. In at least some embodiments, logit difference 127 is a vector of differences in probability for each possible next word in a sequence. In at least some embodiments, logit difference 127 represents a difference in likelihood of each of the most likely candidates for output. In at least some embodiments, a dimensionality of logit difference 127 is identical to first LLM logit 121, second LLM logit 124, and third LLM logit 126.

Logit Sum 128 represents the sum of logit difference 127 and second LLM logit 124. In at least some embodiments, logit sum 128 represents an adjusted logit. In at least some embodiments, logit sum 128 is the adjusted logit utilized in acquiring the output. In at least some embodiments, logit sum 128 is a vector of probabilities for each possible next word in a sequence. In at least some embodiments, logit sum 128 represents a likelihood of each of the most likely candidates for output. In at least some embodiments, a dimensionality of logit sum 128 is identical to first LLM logit 121, second LLM logit 124, and third LLM logit 126.

Figure 2:
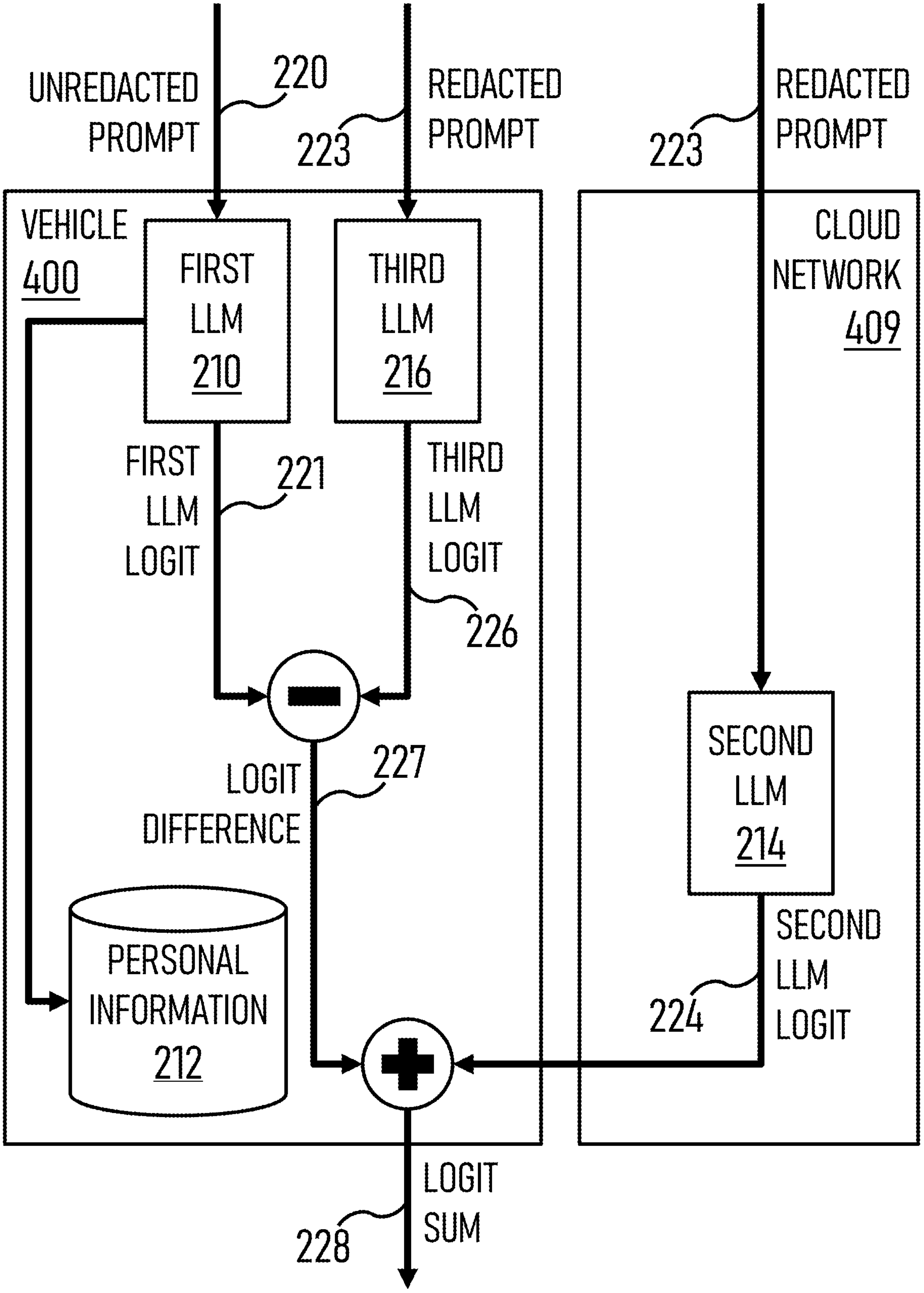
FIG. 2 is a schematic diagram of a system for cloud-assisted in-vehicle large language model use, according to at least some embodiments of the subject disclosure.

FIG. 2 is a schematic diagram of a system for cloud-assisted in-vehicle large language model use, according to at least some embodiments of the subject disclosure. The system includes vehicle 200, cloud network 209, first LLM 210, unredacted prompt 220, personal information 212, first LLM logit 221, second LLM 214, redacted prompt 223, second LLM logit 224, third LLM 216, third LLM logit 226, logit difference 227, and logit sum 228.

Vehicle 200, cloud network 209, first LLM 210, unredacted prompt 220, personal information 212, first LLM logit 221, second LLM 214, redacted prompt 223, second LLM logit 224, third LLM 216, third LLM logit 226, logit difference 227, and logit sum 228 are each substantially similar in structure and function to vehicle 100, cloud network 109, first LLM 110, unredacted prompt 120, personal information 112, first LLM logit 121, second LLM 114, redacted prompt 123, second LLM logit 124, third LLM 116, third LLM logit 126, logit difference 127, and logit sum 128, respectively, except as expressed otherwise herein.

In the system of FIG. 2, third LLM 216 is included in vehicle 200. In at least some embodiments, third LLM 216 includes a software module installed in a computing system of vehicle 200. In at least some embodiments, vehicle 200 is configured to receive second LLM logit from cloud network 209, but is not necessarily configured to receive third LLM logit 226 from cloud network 209. In at least some embodiments, vehicle 200 requires more computational resources than vehicle 100 of FIG. 1, but does not require as much communication with cloud network 209 as vehicle 100 requires with cloud 109 of FIG. 1.

Figure 3:
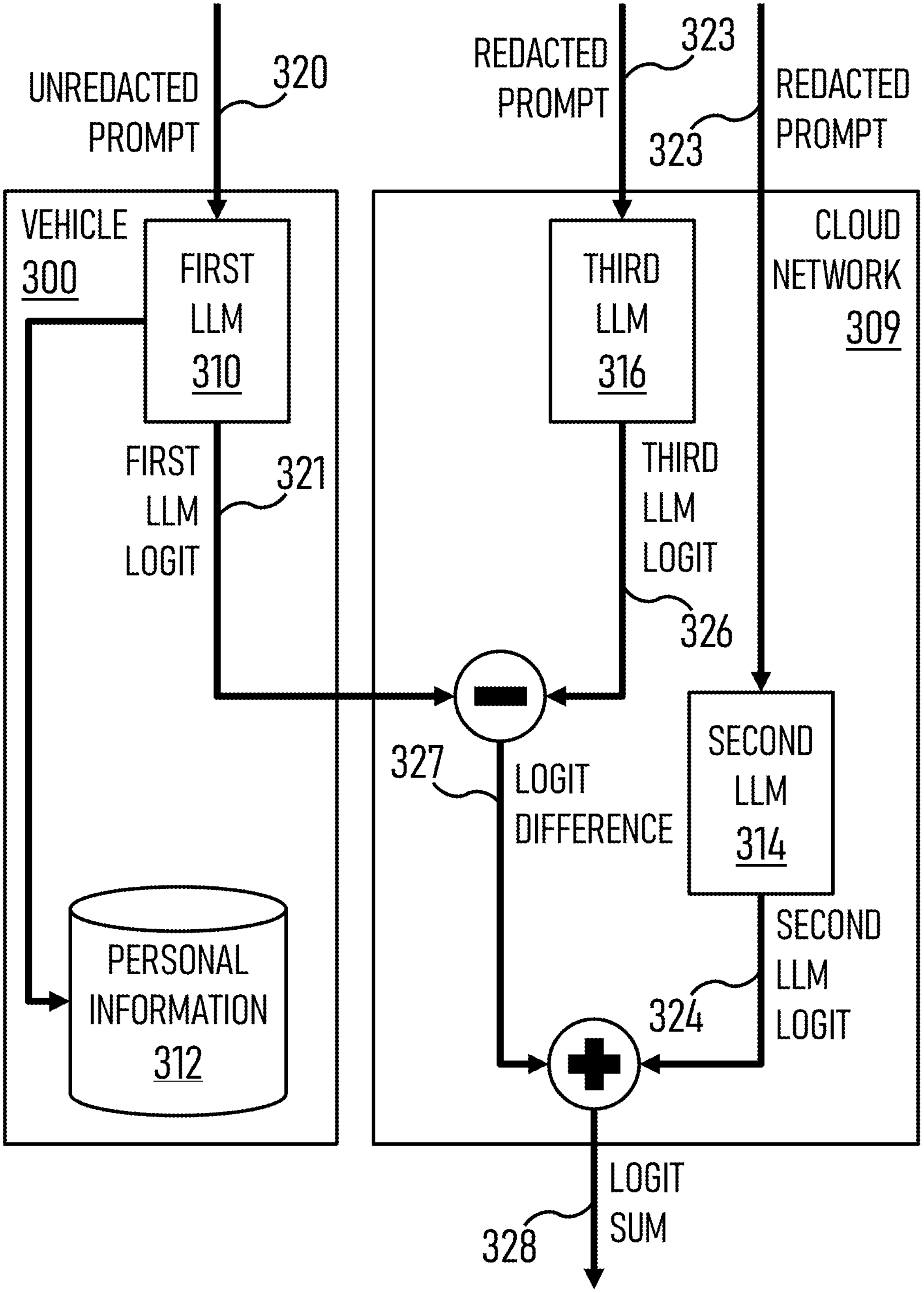
FIG. 3 is a schematic diagram of a system for cloud-assisted in-vehicle large language model use, according to at least some embodiments of the subject disclosure.

FIG. 3 is a schematic diagram of a system for cloud-assisted in-vehicle large language model use, according to at least some embodiments of the subject disclosure. The system includes vehicle 300, cloud network 309, first LLM 310, unredacted prompt 320, personal information 312, first LLM logit 321, second LLM 314, redacted prompt 323, second LLM logit 324, third LLM 316, third LLM logit 326, logit difference 327, and logit sum 328.

Vehicle 300, cloud network 309, first LLM 310, unredacted prompt 320, personal information 312, first LLM logit 321, second LLM 314, redacted prompt 323, second LLM logit 324, third LLM 316, third LLM logit 326, logit difference 327, and logit sum 328 are each substantially similar in structure and function to vehicle 100, cloud network 109, first LLM 110, unredacted prompt 120, personal information 112, first LLM logit 121, second LLM 114, redacted prompt 123, second LLM logit 124, third LLM 116, third LLM logit 126, logit difference 127, and logit sum 128, respectively, except as expressed otherwise herein.

In the system of FIG. 3, logit difference 327 and logit sum 328 are determined by cloud network 309. In at least some embodiments, vehicle 300 is configured to transmit first LLM logit 321 to cloud network 309. In at least some embodiments, cloud network 309 is configured to receive first LLM logit 321 from vehicle 300. In at least some embodiments, cloud network 309 is configured to determine logit difference 327 by comparing first LLM logit 321 and third LLM logit 326. In at least some embodiments, cloud network 309 is configured to determine logit sum 328 by adding logit difference 327 to second LLM logit 324. In at least some embodiments, cloud network 309 is configured to transmit logit sum 328, or output determined therefrom, to vehicle 300. In at least some embodiments, vehicle 300 requires less computational resources than vehicle 100 of FIG. 1, and also requires less communication with cloud network 309 then vehicle 200 requires with cloud 209 of FIG. 2.

Figure 4:
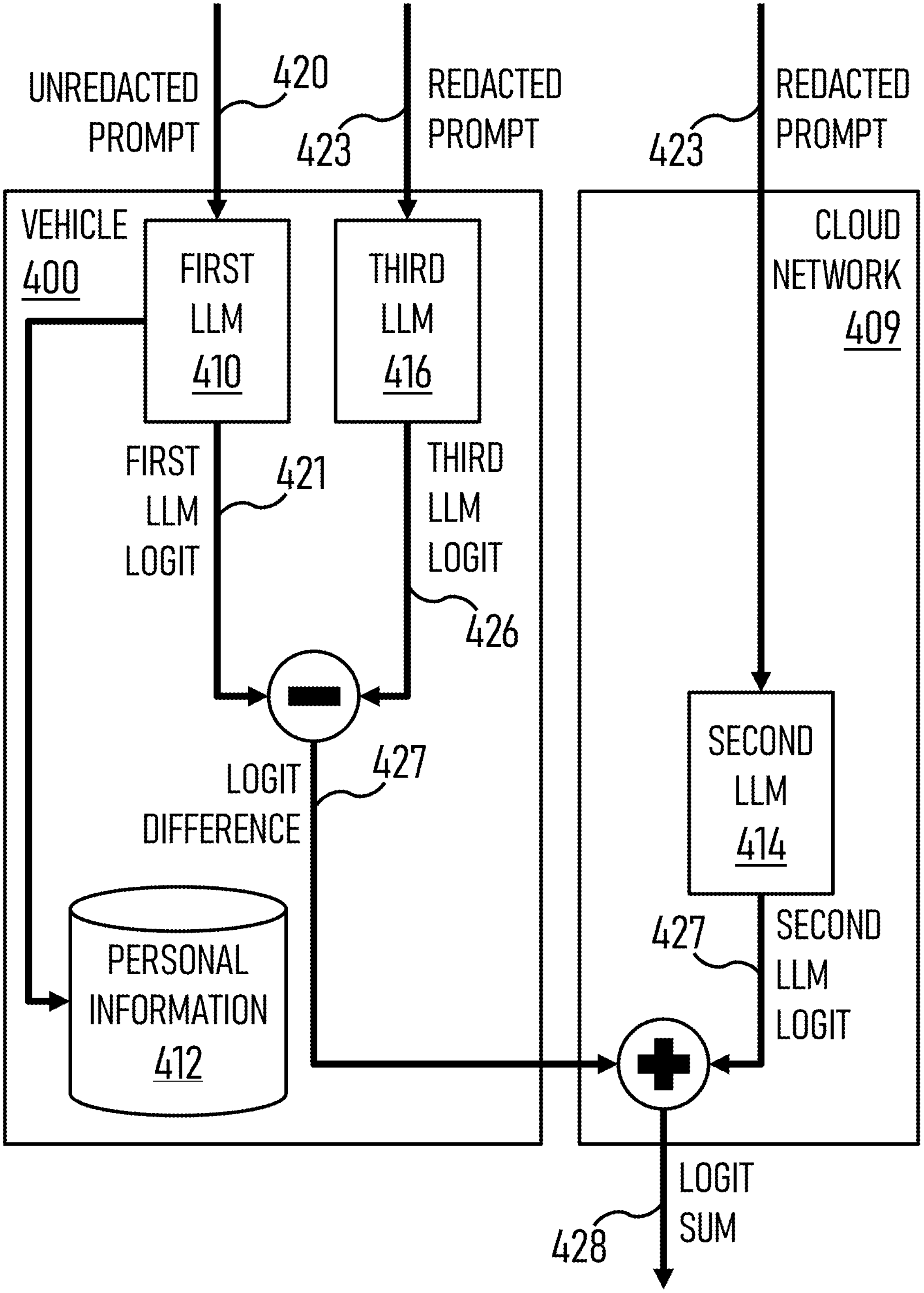
FIG. 4 is a schematic diagram of a system for cloud-assisted in-vehicle large language model use, according to at least some embodiments of the subject disclosure.

FIG. 4 is a schematic diagram of a system for cloud-assisted in-vehicle large language model use, according to at least some embodiments of the subject disclosure. The system includes vehicle 400, cloud network 409, first LLM 410, unredacted prompt 420, personal information 412, first LLM logit 421, second LLM 414, redacted prompt 423, second LLM logit 424, third LLM 416, third LLM logit 426, logit difference 427, and logit sum 428.

Vehicle 400, cloud network 409, first LLM 410, unredacted prompt 420, personal information 412, first LLM logit 421, second LLM 414, redacted prompt 423, second LLM logit 424, third LLM 416, third LLM logit 426, logit difference 427, and logit sum 428 are each substantially similar in structure and function to vehicle 200, cloud network 209, first LLM 210, unredacted prompt 220, personal information 212, first LLM logit 221, second LLM 214, redacted prompt 223, second LLM logit 224, third LLM 216, third LLM logit 226, logit difference 227, and logit sum 228, respectively, except as expressed otherwise herein.

In the system of FIG. 4, logit sum 428 is determined by cloud network 409. In at least some embodiments, vehicle 400 is configured to transmit logit difference 427 to cloud network 409. In at least some embodiments, cloud network 409 is configured to receive logit difference 427 from vehicle 400. In at least some embodiments, cloud network 409 is configured to determine logit sum 428 by adding logit difference 427 to second LLM logit 424. In at least some embodiments, cloud network 409 is configured to transmit logit sum 428, or output determined therefrom, to vehicle 400. In at least some embodiments, vehicle 400 requires less computational resources than vehicle 100 of FIG. 1, but more than vehicle 300 of FIG. 3. In at least some embodiments, vehicle 400 requires less communication with cloud network 409 than vehicle 200 requires with cloud 209 of FIG. 2, but no less than vehicle 300 requires with cloud 309 of FIG. 3.

In at least some embodiments other than the embodiments of FIGS. 1-4, the vehicle and the components and functions are distributed between the vehicle and the cloud network in different ways in which the unredacted prompt is not transmitted from the vehicle and the second LLM logit is processed at least in part using computational resources of the cloud network.

Figure 5:
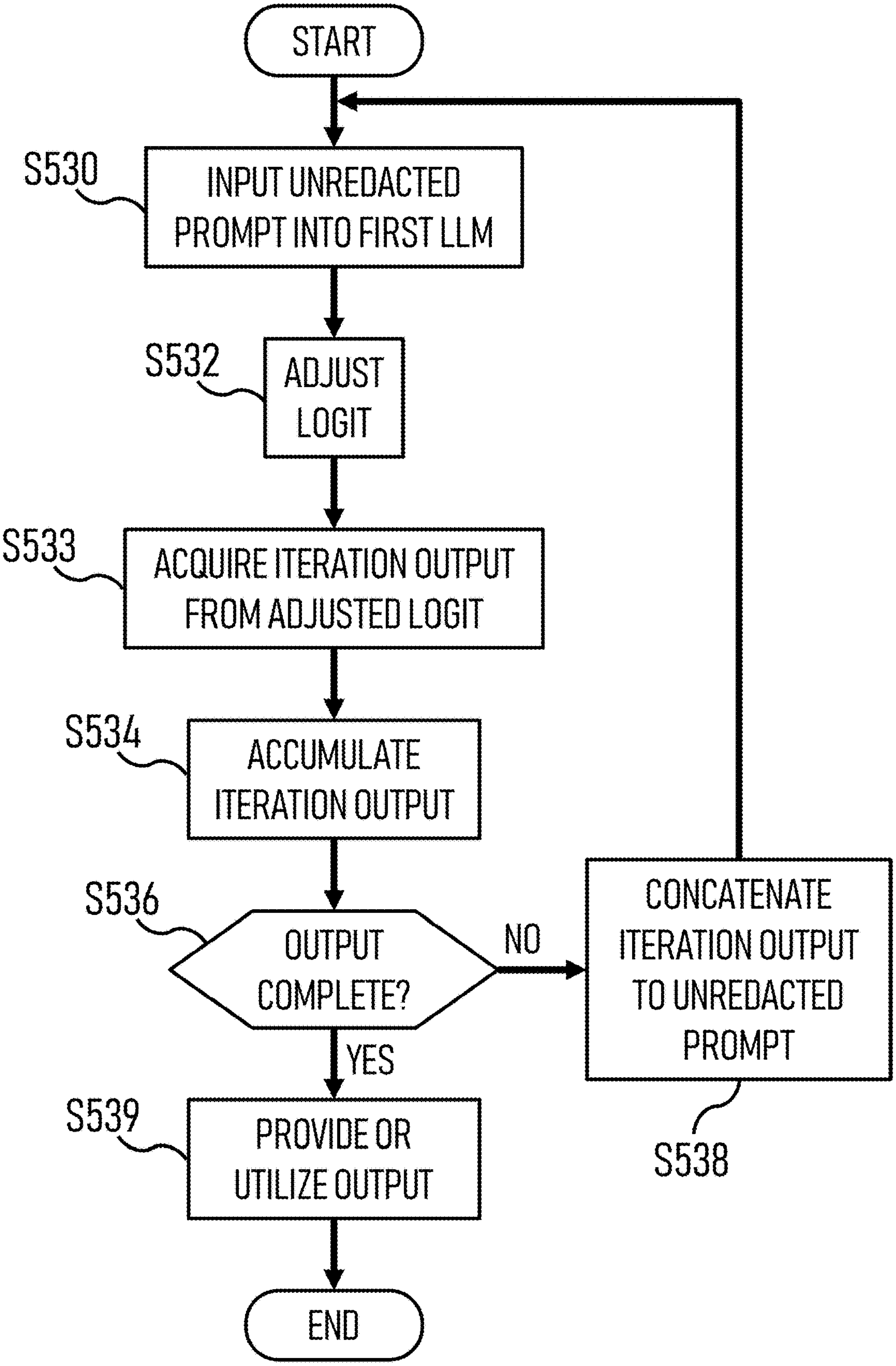
FIG. 5 is an operational flow for cloud-assisted in-vehicle large language model use, according to at least some embodiments of the subject disclosure.

FIG. 5 is an operational flow for cloud-assisted in-vehicle large language model use, according to at least some embodiments of the subject disclosure. In at least some embodiments, the operational flow provides a method of cloud-assisted in-vehicle large language model use, according to at least some embodiments of the subject disclosure. In at least some embodiments, the method is performed by a controller of a server, such as controller 1002 of server 1000 of FIG. 10, described hereinafter.

At S530, the controller inputs an unredacted prompt into the first LLM. In at least some embodiments, the controller inputs an unredacted prompt into the first large language model (LLM) installed in the vehicle. In at least some embodiments, the unredacted prompt contains personal information. In at least some embodiments, the controller obtains a logit output from the first LLM. In at least some embodiments, the logit is utilized in subsequent operations. In at least some embodiments, the controller performs the operational flow of FIG. 6, explained hereinafter.

At S532, the controller adjusts the logit. In at least some embodiments, the controller adjusts the logit output from the first LLM based on other logits of similar LLMs. In at least some embodiments, the controller adjusts the logit based on other logits of similar cloud-based LLMs. In at least some embodiments, the controller calculates an adjusted logit. In at least some embodiments, the controller performs the operational flow of FIG. 8, explained hereinafter.

At S533, the controller acquires an iteration output from the adjusted logit. In at least some embodiments, the controller converts the adjusted logit into human or computer interpretable output. In at least some embodiments, the controller acquires a subsequent word in a sequence of words.

At S534, the controller accumulates the iteration output. In at least some embodiments, the controller accumulates the iteration output from a current iteration with iteration output of previous iterations. In at least some embodiments, the controller accumulates a sequence of words following the unredacted prompt.

At S536, the controller determines whether the output is complete. In response to the output not being complete, the operational flow proceeds to concatenating the iteration output to the unredacted prompt at S538 before returning to prompt input at S530. In response to the output being complete, the operational flow proceeds to providing or utilizing the output at S539. In at least some embodiments, the controller determines whether to proceed with further iterations by determining a probability that the sequence is complete is greater than the probability of any other word in the sequence.

At S538, the controller concatenates the iteration output to the unredacted prompt. In at least some embodiments, the controller concatenates the sequence of words with the unredacted prompt. In at least some embodiments, the resulting concatenation is input as an updated unredacted prompt into the first LLM in the next iteration of S530.

At S539, the controller provides or utilizes the output. In at least some embodiments, the controller provides the accumulated output to the occupant of the vehicle or utilizes the output to control the vehicle. In at least some embodiments, the controller displays the accumulated output through a display of the vehicle, announces the accumulated output through a speaker of the vehicle, etc. In at least some embodiments, the controller utilizes the accumulated output to control the vehicle or a component thereof, or transmits the accumulated output to another component of the vehicle for control of the vehicle or a component thereof.

Figure 6:
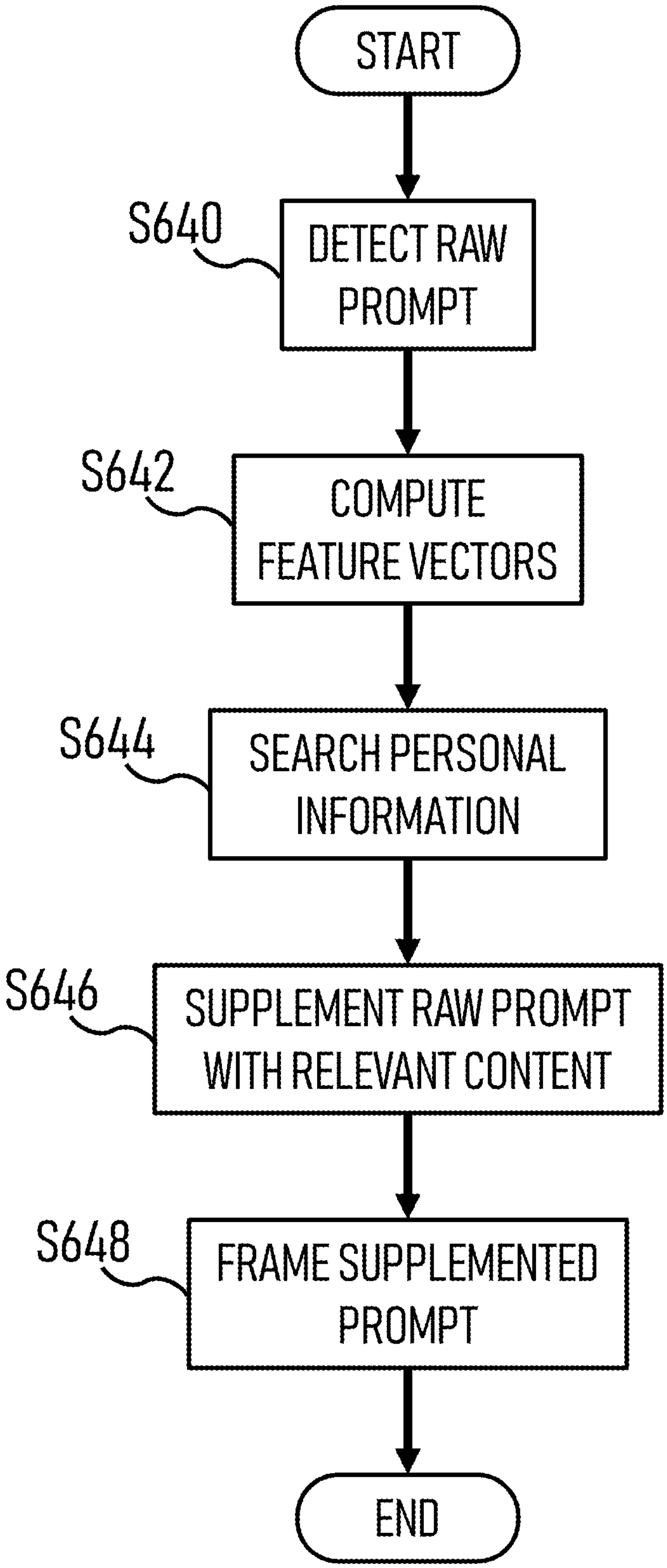
FIG. 6 is an operational flow for preparing unredacted prompt, according to at least some embodiments of the subject disclosure.

FIG. 6 is an operational flow for preparing unredacted prompt, according to at least some embodiments of the subject disclosure. In at least some embodiments, the operational flow provides a method of preparing unredacted prompt, according to at least some embodiments of the subject disclosure. In at least some embodiments, the method is performed by a controller of a server, such as controller 1002 of server 1000 of FIG. 10, described hereinafter.

At S640, the controller or a section thereof detects a raw prompt. In at least some embodiments, the controller identifies and captures a raw prompt, such as a voice sample, an image of the occupant, etc. In at least some embodiments, the controller detects the raw prompt through a microphone, image sensor, etc. In at least some embodiments, the controller is active and ready to receive raw prompts.

At S642, the controller or a section thereof computes a feature vector. In at least some embodiments, the controller processes the raw prompt to compute one or more feature vectors. In at least some embodiments, the controller extracts embedded information for relating to personal information. In at least some embodiments, the controller transforms the raw prompt into a format that can be analyzed and processed.

At S644, the controller or a section thereof searches for personal information. In at least some embodiments, the controller analyzes the feature vectors to identify any personal information relating to the occupant that is relevant to the raw prompt. In at least some embodiments, the controller determines which personal information is relevant by comparing the feature vectors computed from the raw prompt with feature vectors of the personal information. In at least some embodiments, the controller determines relevant personal information by proximity in feature space of the feature vectors of the personal information with the feature vectors computed from the raw prompt. In at least some embodiments, the controller applies a distance formula to calculate the distance between feature vectors in feature space, and identifies personal information corresponding to feature vectors nearest to the feature vectors computed from the raw prompt. In at least some embodiments, the controller utilizes a Retrieval Augmented Generation (RAG) technique.

At S646, the controller or a section thereof supplements the raw prompt with relevant content. In at least some embodiments, the controller adds relevant content to the raw prompt based on the identified personal information. In at least some embodiments, as a result of this operation, the raw prompt is supplemented with relevant personal information. In at least some embodiments, the controller performs this operation to enhance the effectiveness and accuracy of the output of the LLMs in response to the prompt.

At S648, the controller or a section thereof frames the supplemented prompt. In at least some embodiments, the controller structures the supplemented prompt into a format suitable for input into the LLM. In at least some embodiments, the framed supplemented prompt is used as the unredacted prompt in the cloud-assisted in-vehicle large language model use. In at least some embodiments, the controller utilizes an engineered prompt frame. In at least some embodiments, the controller proves context to the LLM through an engineered prompt frame. In at least some embodiments, the controller utilizes a prompt frame that conveys to the LLM that the user is driving a car.

Figure 7:
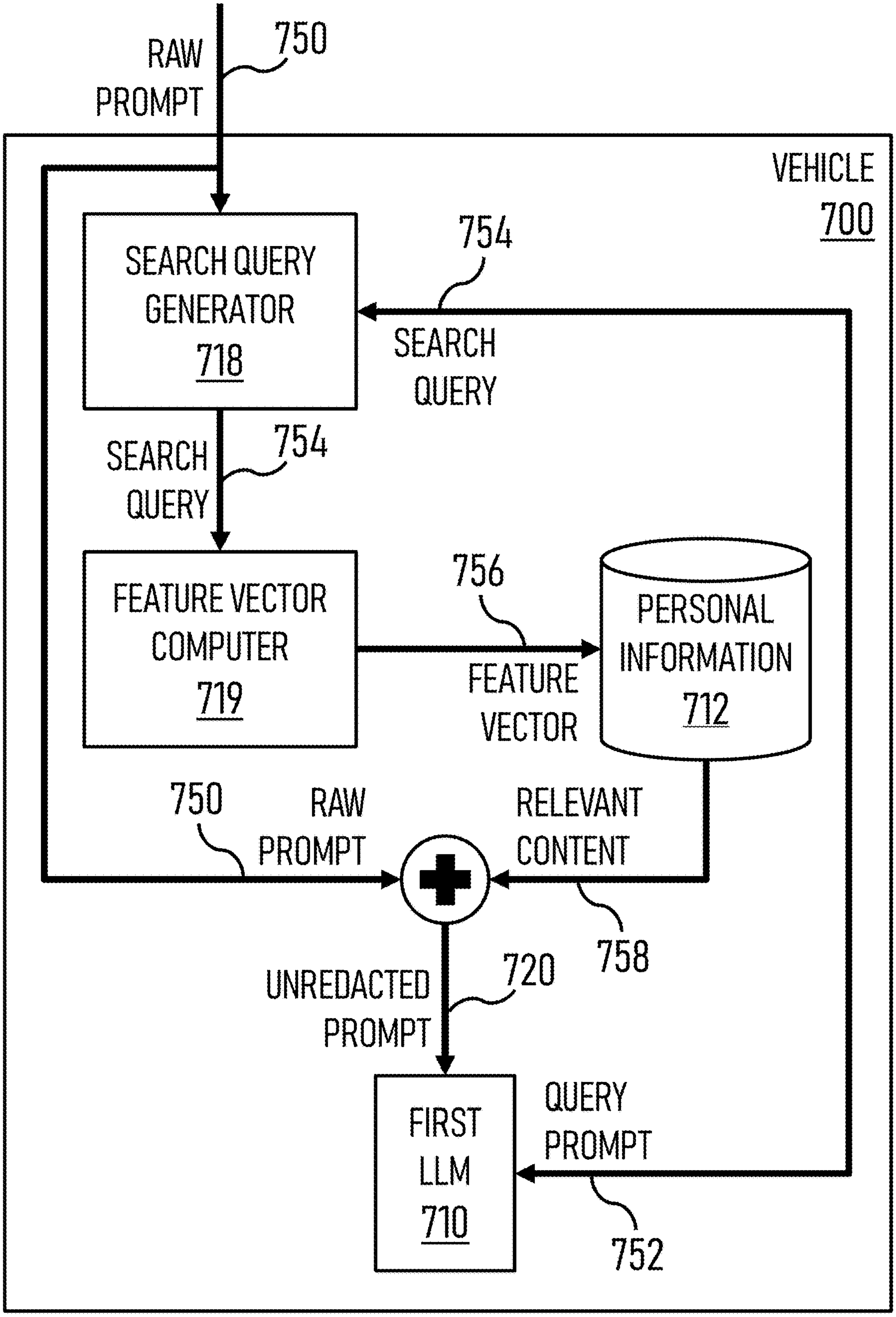
FIG. 7 is a schematic diagram of a vehicle, according to at least some embodiments of the subject disclosure.

FIG. 7 is a schematic diagram of a vehicle, according to at least some embodiments of the subject disclosure. The system includes vehicle 700, first LLM 710, personal information 712, raw prompt 750, search query generator 718, query prompt 752, search query 754, feature vector computer 719, feature vector 756, relevant content 758, and unredacted prompt 720. In at least some embodiments, vehicle 700 is configured to utilize RAG techniques.

Vehicle 700, first LLM 710, personal information 712, and unredacted prompt 720 are each substantially similar in structure and function to vehicle 100, first LLM 110, personal information 112, and unredacted prompt 120, respectively, except as expressed otherwise herein.

Raw prompt 750 is the initially detected input from the user. In at least some embodiments, raw prompt 750 is a text string, a voice command, etc. In at least some embodiments, raw prompt 750 is detected by a microphone, image sensor, etc.

Search query generator 718 is configured to generate query prompts based on raw prompts. In at least some embodiments, search query generator 718 is configured to generate query prompt 752 based on raw prompt 750. In at least some embodiments, search query generator 718 is configured to input query prompt 752 to first LLM 710 to cause first LLM 710 to output search query 754. In at least some embodiments, search query generator 718 is a software module, an algorithm, etc. In at least some embodiments, search query generator 718 is configured to receive search query 754 from first LLM 710. In at least some embodiments, search query generator 718 is configured to transmit search query 754 to feature vector computer 719.

Query prompt 752 is produced by search query generator. In at least some embodiments, query prompt 752 is configured as a prompt for first LLM 710 to output search queries for identifying relevant personal information. In at least some embodiments, query prompt 752 is a text string representing a search query.

Search query 754 is output by first LLM 710 for assisting in identifying personal information. In at least some embodiments, search query 754 is configured for combining with raw prompt 750.

Feature vector computer 719 is configured to compute feature vectors based on search queries. In at least some embodiments, feature vector computer 719 is configured to compute a feature vector based on search query 754 and raw prompt 750. In at least some embodiments, feature vector computer 719 is configured to apply a machine learning model to compute feature vector 756.

Feature Vector 756 is used to identify relevant content among personal information 712. In at least some embodiments, feature vector 756 is a numerical vector. In at least some embodiments, feature vector 756 includes embedded information for relating to personal information. In at least some embodiments, feature vector 756 represents a position of search query 754 in feature space.

Relevant content 758 represents personal information relevant to raw prompt 750. In at least some embodiments, relevant content 758 is combined with raw prompt 750 to form unredacted prompt 720. In at least some embodiments, relevant content 758 is a text string, a multimedia content, etc.

Figure 8:
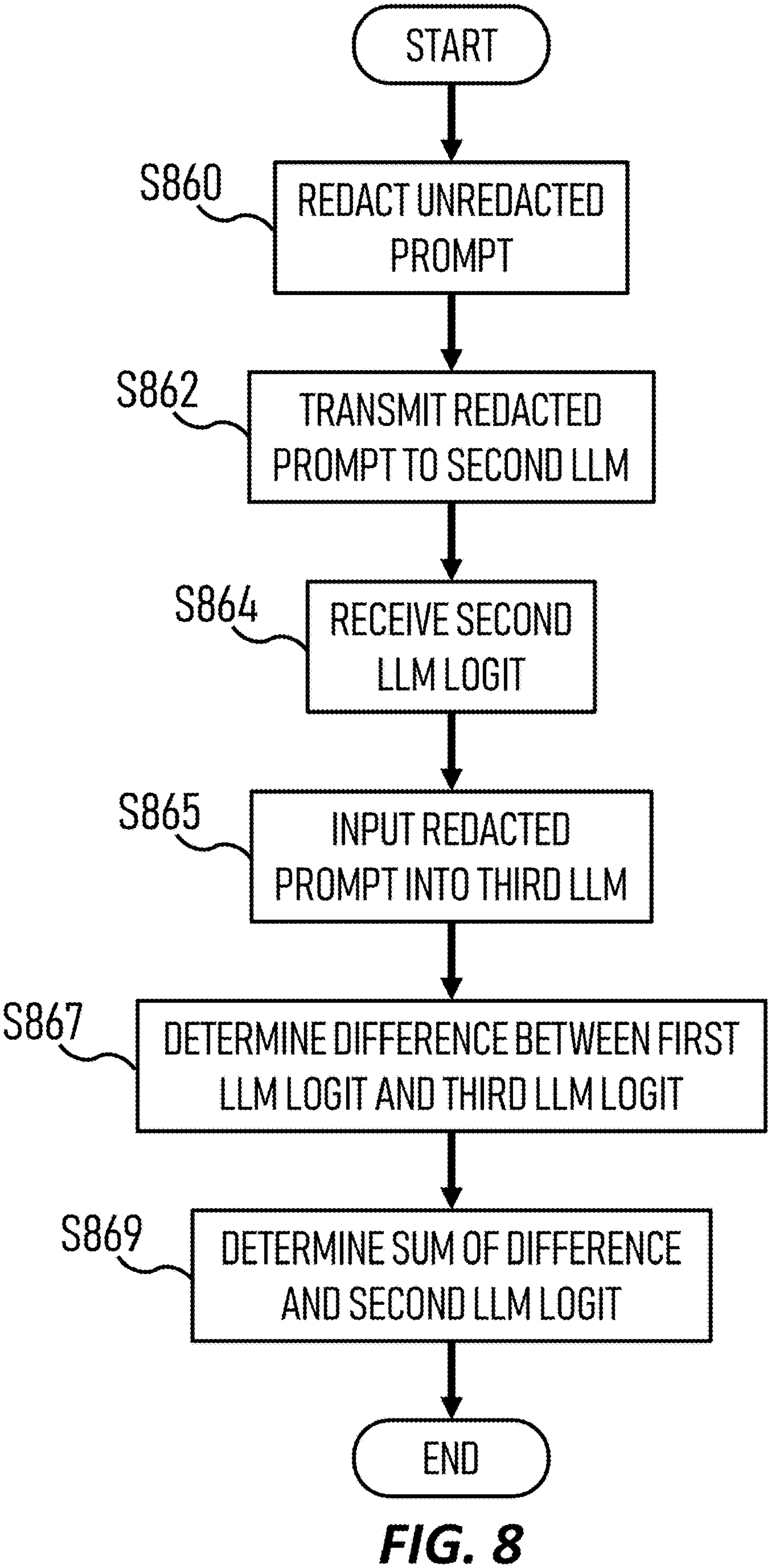
FIG. 8 is an operational flow for adjusting logit, according to at least some embodiments of the subject disclosure.

FIG. 8 is an operational flow for adjusting logit, according to at least some embodiments of the subject disclosure. In at least some embodiments, the operational flow provides a method of adjusting logit, according to at least some embodiments of the subject disclosure. In at least some embodiments, the method is performed by a controller of a server, such as controller 1002 of server 1000 of FIG. 10, described hereinafter.

At S860, the controller or a section thereof redacts personal information from the unredacted prompt. In at least some embodiments, the controller removes personal information from the unredacted prompt to increase privacy. In at least some embodiments, the controller performs the operational flow of FIG. 9, explained hereinafter.

At S862, the controller or a section thereof transmits the redacted prompt to a second LLM. In at least some embodiments, the controller transmits the redacted prompt to a second large language model (LLM) located in a cloud network. In at least some embodiments, the controller transmits the redacted prompt from a vehicle. In at least some embodiments, the controller causes a transceiver of the vehicle to transmit the redacted prompt through a network, such as a WiFi network, radio access network, etc.

At S864, the controller or a section thereof receives a logit output from the second LLM. In at least some embodiments, the controller receives, from the cloud network, the logit output from the second LLM. In at least some embodiments, the controller retrieves the logit output from the second LLM. In at least some embodiments, the controller instructs the cloud network to transmit the logit output from the second LLM.

At S865, the controller or a section thereof inputs the redacted prompt into a third LLM. In at least some embodiments, the controller inputs the redacted prompt into a third LLM operated by the vehicle. In at least some embodiments, the controller causes the redacted prompt to be input into a third LLM operated by the cloud network.

At S867, the controller or a section thereof determines the difference between the logits of the first LLM and the third LLM. In at least some embodiments, the controller calculates the difference between corresponding likelihoods in the logits of the first LLM and the third LLM. In at least some embodiments, the controller compares the logits of the first LLM and the third LLM to determine the difference. In at least some embodiments, the controller produces a difference having the same dimensionality as the logits of the first LLM and the third LLM.

At S869, the controller or a section thereof determines the sum of the difference and the logit of the second LLM. In at least some embodiments, the controller calculates the sum of the difference and the logit of the second LLM. In at least some embodiments, the control determines the sum to obtain an adjusted logit. In at least some embodiments, the controller produces a sum having the same dimensionality as the logits of the first LLM, the second LLM, and the third LLM.

Figure 9:
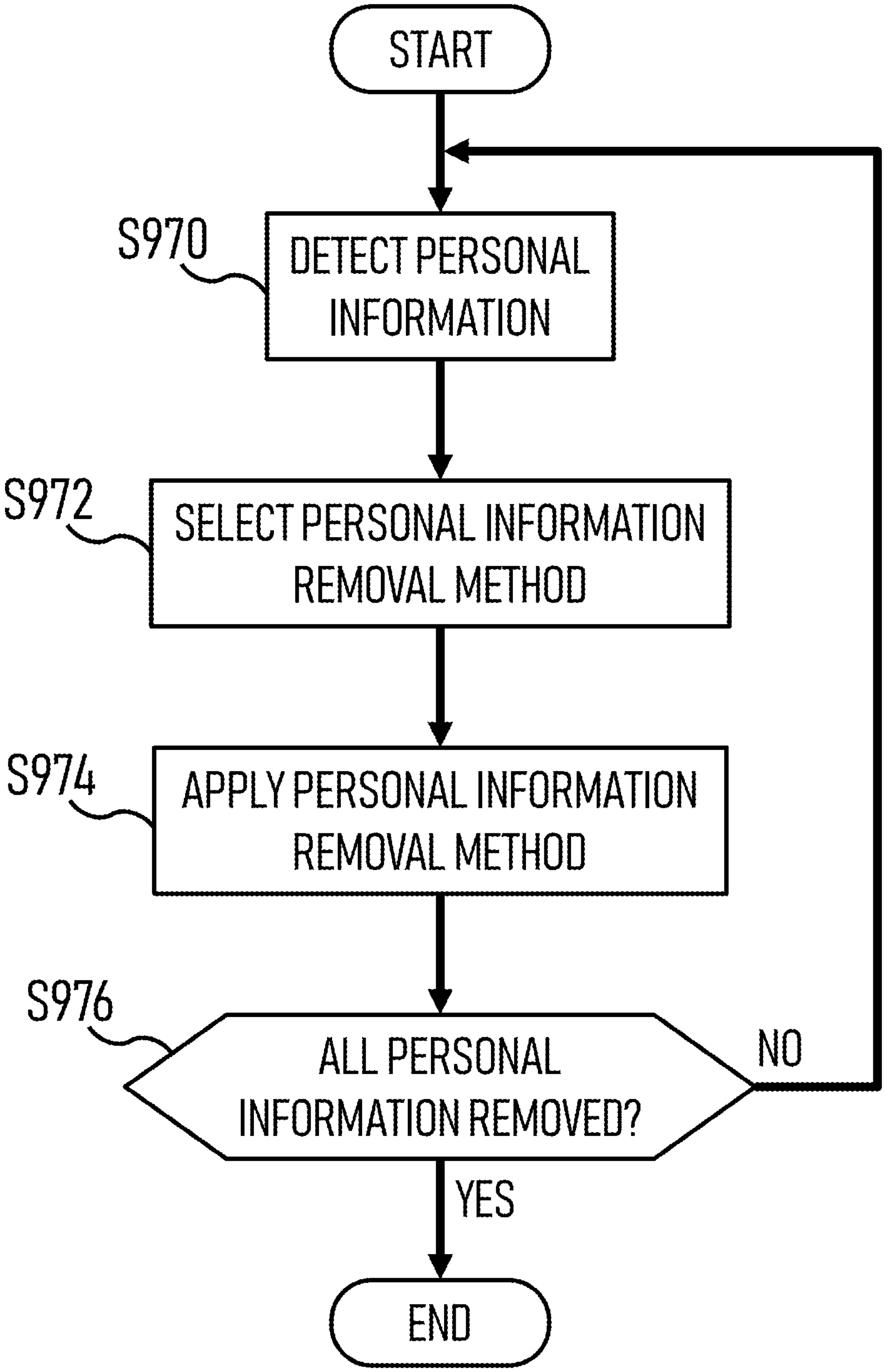
FIG. 9 is an operational flow for redacting prompt, according to at least some embodiments of the subject disclosure.

FIG. 9 is an operational flow for redacting prompt, according to at least some embodiments of the subject disclosure. In at least some embodiments, the operational flow provides a method of redacting prompt, according to at least some embodiments of the subject disclosure. In at least some embodiments, the method is performed by a controller of a server, such as controller 1002 of server 1000 of FIG. 10, described hereinafter.

At S970, the controller or a section thereof detects personal information. In at least some embodiments, the controller scans the unredacted prompt to identify any personal information. In at least some embodiments, the controller compares the unredacted prompt with a database of personal information to identify any personal information. In at least some embodiments, the controller performs pattern recognition, keyword detection, or other data analysis techniques. In at least some embodiments, the controller identifies one or more portions of the unredacted prompt that include personal information.

At S972, the controller or a section thereof selects a method for personal information removal. In at least some embodiments, the controller chooses an appropriate method for removal based on the type and context of the detected personal information. In at least some embodiments, the controller selects a method from among anonymization, pseudonymization, or complete removal. In at least some embodiments, the controller selects a method that balances privacy and accuracy. In at least some embodiments, the controller selects a method that protects the user's personal information while maintaining the integrity of the prompt.

At S974, the controller or a section thereof applies the selected personal information removal method. In at least some embodiments, the controller applies the selected removal method to the unredacted prompt. In at least some embodiments, this action effectively redacts the identified personal information. In at least some embodiments, this operation does not cause any actions outside of the redacting prompt operations. In at least some embodiments, this operation is performed after a removal method has been selected. In at least some embodiments, the result of this operation is a redacted prompt with personal information removed. In at least some embodiments, this operation creates a version of the prompt that respects the user's privacy.

At S976, the controller or a section thereof determines whether all personal information has been removed. In response to determining that all personal information has not been completely removed, the operational flow returns to detecting personal information at S970. In response to determining that all personal information has been removed, the operational flow ends. In at least some embodiments, the controller verifies the redacted prompt to ensure all personal information has been effectively removed.

Figure 10:
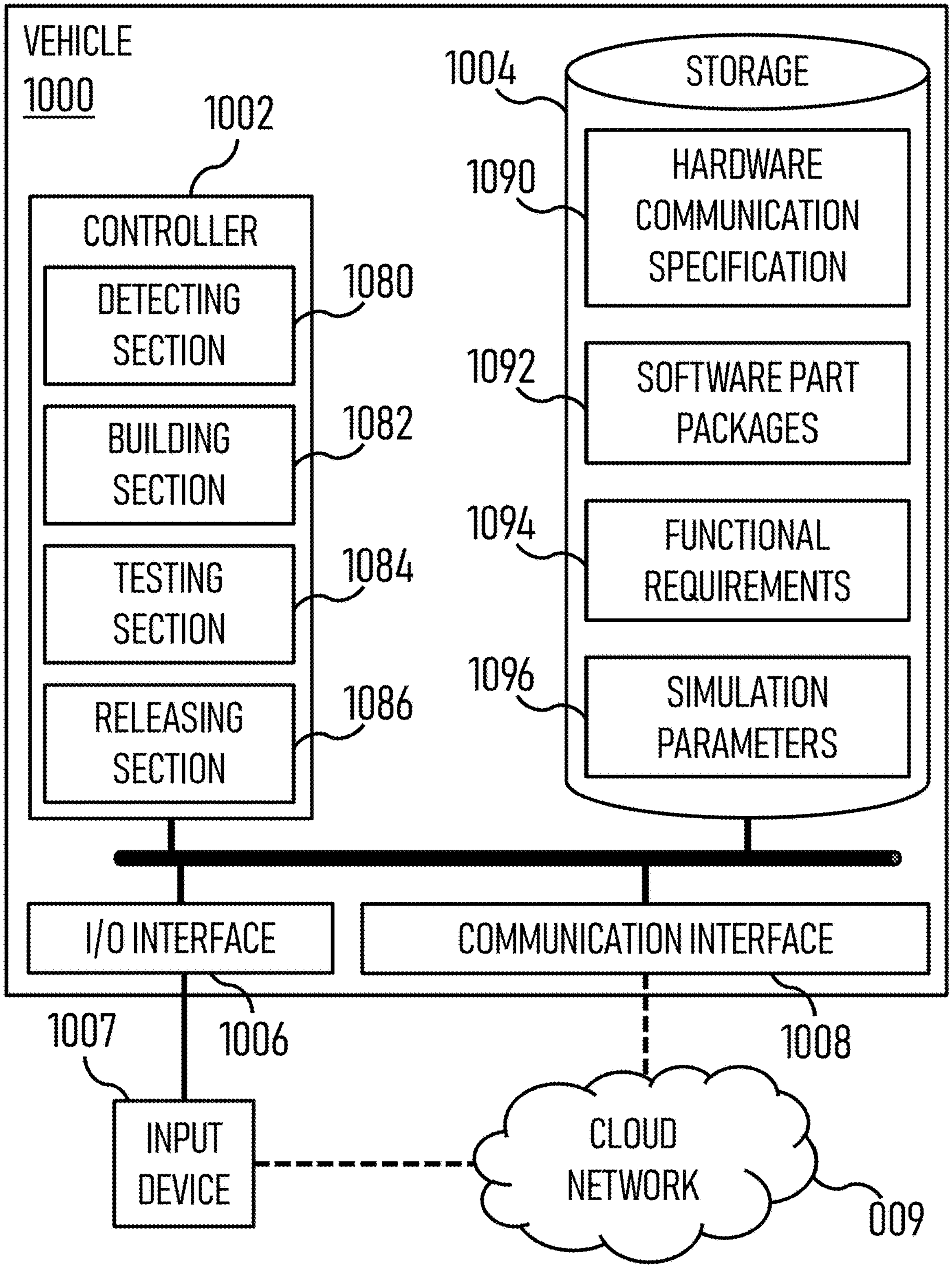
FIG. 10 is a block diagram of a hardware configuration for cloud-assisted in-vehicle large language model use, according to at least some embodiments of the subject disclosure.

FIG. 10 is a block diagram of a hardware configuration for cloud-assisted in-vehicle large language model use, according to at least some embodiments of the subject disclosure.

The exemplary hardware configuration includes server 1000, which interacts with input device 1007 directly or through cloud network 1009. In at least some embodiments, input device 1007 is a touch screen, a microphone, a camera, or any other device configured to detect tactile, aural, visual, etc. input. In at least some embodiments, cloud network 1009 is a wide area network, such as the Internet. In at least some embodiments, server 1000 is a computer or other computing device that receives input or commands from input device 1007. In at least some embodiments, server 1000 is integrated with input device 1007. In at least some embodiments, server 1000 is a computer system that executes computer-readable instructions to perform operations for cloud-assisted in-vehicle large language model use.

Server 1000 includes a controller 1002, a storage 1004, an input/output interface 1006, and a communication interface 1008. In at least some embodiments, controller 1002 includes a processor or programmable circuitry executing instructions to cause the processor or programmable circuitry to perform operations according to the instructions. In at least some embodiments, controller 1002 includes analog or digital programmable circuitry, or any combination thereof. In at least some embodiments, controller 1002 includes physically separated storage or circuitry that interacts through communication. In at least some embodiments, storage 1004 includes a non-volatile computer-readable medium capable of storing executable and non-executable data for access by controller 1002 during execution of the instructions. In at least some embodiments, communication interface 1008 transmits and receives data from cloud network 1009. In at least some embodiments, input/output interface 1006 connects to various input and output units, such as input device 1007, via a parallel port, a serial port, a keyboard port, a mouse port, a monitor port, and the like to accept commands and present information. In some embodiments, storage 1004 is external from server 1000.

Controller 1002 includes inputting section 1080, adjusting section 1082, redacting section 1084, and determining section 1086. Storage 1004 includes personal information 1090, large language models 1092, adjusting parameters 1094, and redacting parameters 1096.

Inputting section 1080 is the circuitry or instructions of controller 1002 configured to input prompts into LLMs. In at least some embodiments, inputting section 1080 is configured to input an unredacted prompt into a first LLM installed in a vehicle, input a redacted prompt into a second LLM installed in a cloud network, and input the redacted prompt into a third LLM installed in the vehicle or the cloud network. In at least some embodiments, inputting section 1080 utilizes information in storage 1004, such as large language models 1092. In at least some embodiments, inputting section 1080 includes sub-sections for performing additional functions, as described in the foregoing flow charts. In at least some embodiments, such sub-sections are referred to by a name associated with a corresponding function.

Adjusting section 1082 is the circuitry or instructions of controller 1002 configured to adjust logits. In at least some embodiments, adjusting section 1082 is configured to compute an adjusted logit based on logits output from the first LLM, the second LLM, and the third LLM. In at least some embodiments, adjusting section 1082 utilizes information in storage 1004, such as adjusting parameters 1094. In at least some embodiments, adjusting section 1082 includes sub-sections for performing additional functions, as described in the foregoing flow charts. In at least some embodiments, such sub-sections are referred to by a name associated with a corresponding function.

Redacting section 1084 is the circuitry or instructions of controller 1002 configured to redact unredacted prompts. In at least some embodiments, redacting section 1084 is configured to redact the personal information from the unredacted prompt to produce the redacted prompt. In at least some embodiments, adjusting section 1082 utilizes information in storage 1004, such as personal information 1090 and redacting parameters 1096. In at least some embodiments, redacting section 1084 includes sub-sections for performing additional functions, as described in the foregoing flow charts. In at least some embodiments, such sub-sections are referred to by a name associated with a corresponding function.

Determining section 1086 is the circuitry or instructions of controller 1002 configured to determine differences between logits. In at least some embodiments, determining section 1086 is configured to determining a difference between a logit of the first LLM and a logit of the third LLM. In at least some embodiments, determining section 1086 utilizes information in storage 1004, such as adjusting parameters 1094. In at least some embodiments, determining section 1086 includes sub-sections for performing additional functions, as described in the foregoing flow charts. In at least some embodiments, such sub-sections are referred to by a name associated with a corresponding function.

In at least some embodiments, the apparatus is another device capable of processing logical functions in order to perform the operations herein. In at least some embodiments, the controller and the storage unit need not be entirely separate devices, but share circuitry or one or more computer-readable mediums in some embodiments. In at least some embodiments, the storage unit includes a hard drive storing both the computer-executable instructions and the data accessed by the controller, and the controller includes a combination of a central processing unit (CPU) and RAM, in which the computer-executable instructions are able to be copied in whole or in part for execution by the CPU during performance of the operations herein.

In at least some embodiments where the apparatus is a computer, a program that is installed in the computer is capable of causing the computer to function as or perform operations associated with apparatuses of the embodiments described herein. In at least some embodiments, such a program is executable by a processor to cause the computer to perform certain operations associated with some or all of the blocks of flowcharts and block diagrams described herein.

At least some embodiments are described with reference to flowcharts and block diagrams whose blocks represent (1) steps of processes in which operations are performed or (2) sections of a controller responsible for performing operations. In at least some embodiments, certain steps and sections are implemented by dedicated circuitry, programmable circuitry supplied with computer-readable instructions stored on computer-readable media, and/or processors supplied with computer-readable instructions stored on computer-readable media. In at least some embodiments, dedicated circuitry includes digital and/or analog hardware circuits and include integrated circuits (IC) and/or discrete circuits. In at least some embodiments, programmable circuitry includes reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

In at least some embodiments, the computer readable storage medium includes a tangible device that is able to retain and store instructions for use by an instruction execution device. In some embodiments, the computer readable storage medium includes, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punch-cards or raised structures in a groove having instructions recorded thereon, and any suitable combination of the foregoing. A computer readable medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

In at least some embodiments, computer readable program instructions described herein are downloadable to respective computing/processing devices from a computer readable storage medium or to an external computer or external storage device via a network, for example, the Internet, a local area network, a wide area network and/or a wireless network. In at least some embodiments, the network includes copper transmission cables, optical transmission fibers, wireless transmission, routers, firewalls, switches, gateway computers and/or edge servers. In at least some embodiments, a network adapter card or network interface in each computing/processing device receives computer readable program instructions from the network and forwards the computer readable program instructions for storage in a computer readable storage medium within the respective computing/processing device.

In at least some embodiments, computer readable program instructions for carrying out operations described above are assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In at least some embodiments, the computer readable program instructions are executed entirely on the user's computer, partly on the user's computer, as a stand-alone software package, partly on the user's computer and partly on a remote computer or entirely on the remote computer or server. In at least some embodiments, in the latter scenario, the remote computer is connected to the user's computer through any type of network, including a local area network (LAN) or a wide area network (WAN), or the connection is made to an external computer (for example, through the Internet using an Internet Service Provider). In at least some embodiments, electronic circuitry including, for example, programmable logic circuitry, field-programmable gate arrays (FPGA), or programmable logic arrays (PLA) execute the computer readable program instructions by utilizing state information of the computer readable program instructions to individualize the electronic circuitry, in order to perform aspects of the present invention.

While embodiments of the present invention have been described, the technical scope of any subject matter claimed is not limited to the above-described embodiments. Persons skilled in the art would understand that various alterations and improvements to the above-described embodiments are possible. Persons skilled in the art would also understand from the scope of the claims that the embodiments added with such alterations or improvements are included in the technical scope of the invention.

The operations, procedures, steps, and stages of each process performed by an apparatus, system, program, and method shown in the claims, embodiments, or diagrams are able to be performed in any order as long as the order is not indicated by "prior to," "before," or the like and as long as the output from a previous process is not used in a later process. Even if the process flow is described using phrases such as "first" or "next" in the claims, embodiments, or diagrams, such a description does not necessarily mean that the processes must be performed in the described order.

In at least some embodiments, cloud-assisted in-vehicle large language model use is performed by inputting an unredacted prompt into a first Large Language Model (LLM) installed in a vehicle, wherein the unredacted prompt includes personal information relating to an occupant of the vehicle, transmitting a redacted prompt to a second LLM installed in a cloud, the redacted prompt representing the unredacted prompt without the personal information, receiving a logit of the second LLM, inputting the redacted prompt into a third LLM installed in the cloud or the vehicle, the third LLM including an identical parameter set to the first LLM, determining a difference between a logit of the first LLM and a logit of the third LLM, determining a sum of the difference and the logit of the second LLM to obtain an adjusted logit, and acquiring an output from the adjusted logit.

In at least some embodiments, the number of parameters of the second LLM is larger than the number of parameters of each of the first LLM and the third LLM. In at least some embodiments, the parameters of the first LLM have been trained using the personal information, and wherein the second LLM and the third LLM have been trained without using the personal information. In at least some embodiments, cloud-assisted in-vehicle large language model use further includes providing the occupant with the output or using the output to control the vehicle. In at least some embodiments, cloud-assisted in-vehicle large language model use further includes detecting a raw prompt, wherein the raw prompt includes at least one of a voice sample or an image of the occupant. In at least some embodiments, cloud-assisted in-vehicle large language model use further includes adding predetermined information to the raw prompt. In at least some embodiments, the predetermined information includes engineered prompt information. In at least some embodiments, cloud-assisted in-vehicle large language model use further includes determining supplemental occupant information that is relevant to the raw prompt. In at least some embodiments, the unredacted prompt includes the supplemental occupant information. In at least some embodiments, the third LLM includes identical parameter values to the first LLM. In at least some embodiments, the third LLM is the first LLM. In at least some embodiments, acquiring the output includes accumulating a plurality of iteration outputs, each iteration output corresponding to an iteration of obtaining an adjusted logit among a plurality of sequential iterations, wherein the unredacted prompt of each iteration includes each iteration output corresponding to preceding iterations among the plurality of sequential iterations. In at least some embodiments, cloud-assisted in-vehicle large language model use further includes redacting the personal information from the unredacted prompt to produce the redacted prompt. In at least some embodiments, the redacting includes at least one of converting speech to text, converting image data to object data, location generalizing, filtering the raw prompt, or randomizing the raw prompt. In at least some embodiments, each of the logits has identical dimensionality.

In at least some embodiments, cloud-assisted in-vehicle large language model use is performed by a processor executing instructions in accordance with the foregoing operations or a device comprising a controller including circuitry configured to perform the foregoing operations.

The foregoing outlines features of several embodiments so that those skilled in the art would better understand the aspects of the present disclosure. Those skilled in the art should appreciate that this disclosure is readily usable as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that various changes, substitutions, and alterations herein are possible without departing from the spirit and scope of the present disclosure.

What is claimed is:

1. A non-transitory computer-readable medium having instructions recorded thereon that, in response to execution by one or more processors, cause performance of operations comprising:

inputting an unredacted prompt into a first Large Language Model (LLM) installed in a vehicle, wherein the unredacted prompt includes personal information relating to an occupant of the vehicle;

transmitting a redacted prompt to a second LLM installed in a cloud, the redacted prompt representing the unredacted prompt without the personal information;

receiving a logit of the second LLM;

inputting the redacted prompt into a third LLM installed in the cloud or the vehicle, the third LLM including an identical parameter set to the first LLM;

determining a difference between a logit of the first LLM and a logit of the third LLM;

determining a sum of the difference and the logit of the second LLM to obtain an adjusted logit; and acquiring an output from the adjusted logit.

2. The computer-readable medium of claim 1, wherein the number of parameters of the second LLM is larger than the number of parameters of each of the first LLM and the third LLM.

3. The computer-readable medium of claim 1, wherein the parameters of the first LLM have been trained using the personal information, and the second LLM and the third LLM have been trained without using the personal information.

4. The computer-readable medium of claim 1, wherein the operations further comprise providing the occupant with the output or using the output to control the vehicle.

5. The computer-readable medium of claim 1, wherein the operations further comprise detecting a raw prompt, wherein the raw prompt includes at least one of a voice sample or an image of the occupant.

6. The computer-readable medium of claim 1, wherein the operations further comprise adding predetermined information to the raw prompt.

7. The computer-readable medium of claim 1, wherein the predetermined information includes engineered prompt information.

8. The computer-readable medium of claim 1, wherein the operations further comprise determining supplemental occupant information that is relevant to the raw prompt.

9. The computer-readable medium of claim 1, wherein the unredacted prompt includes the supplemental occupant information.

10. The computer-readable medium of claim 1, wherein the third LLM includes identical parameter values to the first LLM.

11. The computer-readable medium of claim 1, wherein the third LLM is the first LLM.

12. The computer-readable medium of claim 1, wherein acquiring the output includes accumulating a plurality of iteration outputs, each iteration output corresponding to an iteration of obtaining an adjusted logit among a plurality of sequential iterations, wherein the unredacted prompt of each iteration includes each iteration output corresponding to preceding iterations among the plurality of sequential iterations.

13. The computer-readable medium of claim 1, wherein the operations further comprise redacting the personal information from the unredacted prompt to produce the redacted prompt.

14. The computer-readable medium of claim 1, wherein the redacting includes at least one of converting speech to text, converting image data to object data, location generalizing, filtering the raw prompt, or randomizing the raw prompt.

15. The computer-readable medium of claim 1, wherein each of the logits has identical dimensionality.

16. A method comprising:

inputting an unredacted prompt into a first Large Language Model (LLM) installed in a vehicle, wherein the unredacted prompt includes personal information relating to an occupant of the vehicle;

transmitting a redacted prompt to a second LLM installed in a cloud, the redacted prompt representing the unredacted prompt without the personal information;

receiving a logit of the second LLM;

inputting the redacted prompt into a third LLM installed in the cloud or the vehicle, the third LLM including an identical parameter set to the first LLM;

determining a difference between a logit of the first LLM and a logit of the third LLM;

determining a sum of the difference and the logit of the second LLM to obtain an adjusted logit; and acquiring an output from the adjusted logit.

17. The method of claim 16, wherein the number of parameters of the second LLM is larger than the number of parameters of each of the first LLM and the third LLM.

18. The method of claim 16, wherein the parameters of the first LLM have been trained using the personal information, and the second LLM and the third LLM have been trained without using the personal information.

19. The method of claim 16, further comprising providing the occupant with the output or using the output to control the vehicle.

20. A device comprising:

a controller including circuitry configured to perform operations including inputting an unredacted prompt into a first Large Language Model (LLM) installed in a vehicle, wherein the unredacted prompt includes personal information relating to an occupant of the vehicle, transmitting a redacted prompt to a second LLM installed in a cloud, the redacted prompt representing the unredacted prompt without the personal information, receiving a logit of the second LLM, inputting the redacted prompt into a third LLM installed in the cloud or the vehicle, the third LLM including an identical parameter set to the first LLM, determining a difference between a logit of the first LLM and a logit of the third LLM, determining a sum of the difference and the logit of the second LLM to obtain an adjusted logit, and acquiring an output from the adjusted logit.

* * * * *